United States Patent

Tannenberger et al.

[11] 4,052,532
[45] Oct. 4, 1977

[54] ELECTROLYTE-ELECTRODE ASSEMBLY FOR A COMBUSTIBLE BATTERY

[75] Inventors: Helmut Tannenberger, Geneva; Paul van den Berghe, Satigny, both of Switzerland

[73] Assignee: Compagnie Francaise de Raffinage, Paris, France

[21] Appl. No.: 633,075

[22] Filed: Nov. 18, 1975

[30] Foreign Application Priority Data

Nov. 19, 1974 Switzerland ............... 15356/74

[51] Int. Cl.$^2$ ............................... H01M 8/10
[52] U.S. Cl. ........................................ 429/33
[58] Field of Search ............ 136/86 R, 86 D, 120 FC; 429/33

[56] References Cited

FOREIGN PATENT DOCUMENTS 2,141,802  1/1973  France ............... 136/86 R

Primary Examiner—John H. Mack
Assistant Examiner—H. A. Feeley

[57] ABSTRACT

An electrolyte-electrode assembly for a combustible battery comprising a ceramic solid electrolyte conductive to oxygen ions and impermeable to gas. An electrode is secured on one surface of the electrolyte and comprises a porous layer of doped indium oxide composed of dendrites which form trunks having a diameter between 500 and 10,000 A and whose principal axes are penpendicular to the surface of the electrolyte. A continuous layer of ceramic material, conductive to oxygen ions and electrons is interposed between the electrolyte and the electrode and is solid therewith. The electrode can have a second porous layer formed of granules of at least one chromite having the formula:

$$T_{1-y}Sr_aCa_bCrO_3$$

in which T is a rare earth or yttrium or a mixture of these elements and $y$, $a$ and $b$ are numbers between 0 and 1, being able to take the value 0 and satisfying the equation $a + b = y$.

4 Claims, No Drawings

ELECTROLYTE-ELECTRODE ASSEMBLY FOR A COMBUSTIBLE BATTERY

FIELD OF THE INVENTION

The present invention relates to an electrolyte-electrode assembly for a combustible battery comprising a body impermeable to gas of a solid ceramic electrolyte which is conductive to oxygen ions, and an electrode.

Such assembly is adapted to constitute, in association with an appropriate counter-electrode, a combustible battery capable of operating at high temperatures (for example, in the region between 600° and 110° C) by utilizing a fuel and an oxygen-containing substance in gaseous state.

BACKGROUND

In order to confer to a combustible battery a massive and volumetric density of energy as well as an electrochemical output which is as high as possible, it is necessary to limit the undesirable phenomena of electrochemical polarizaton, which is translated under the operational conditions of the battery, into a drop in voltage which adds to the resistance loss in the electrolyte and which is proportional to the current density to the electrodes (therefore to the intensity of the current delivered by the battery).

This polarization phenomena results from a number of causes which are far from being fully understood at the present time. However, it can be noted that the polarization can be diminished by virtue of the judicious choice of the material of the electrodes (platinum, in the case of the anodes, and silver in the case of the cathode, these having shown themselves to be particularly adequate from this point of view) and of the structure (a fine porous structure appears to be desirable).

However, even though substantial research effort has gone into the construction of electrodes for combustible batteries with solid ceramic electrolyte conductive to oxygen ions, no completely satisfactory solution has been obtained up to the present from the point of view of the elimination of the polarization of the electrodes.

SUMMARY OF THE INVENTION

An object of the invention is to provide improvements in combustible batteries having solid ceramic electrolyte conductive to oxygen ions while reducing the electrochemical polarization for an electrolyte and an electrode of given nature and structure.

To this effect, the electrolyte-electrode assembly according to the invention is characterized by the fact that it comprises a continuous layer of ceramic material conductive to oxygen ions and electrons, said layer being interposed between the electrolyte and the electrode and solid therewith.

According to a variation of the assembly according to the invention, this assembly comprises, in addition, a counter-electrode disposed on the face of the solid electrolyte body opposed to the electrode and a second continuous layer of ceramic material conductive to oxygen ions and electrons interposed between the electrolyte and the counter-electrode and solid therewith.

A feature of the invention is that it permits obtaining a clear improvement, from the point of view of electrochemical polarization, without requiring modification of the nature and of the structure of the electrolyte and the electrode. Thus it renders possible the obtention of combustible batteries with solid electrolyte having superior electrochemical characteristics to those of the best batteries of this type presently known without affecting the other useful properties obtained by these batteries.

The solid ceramic electrolyte which is conductive to oxygen ions, can be made of any appropriate known material, notably a solid solution of mineral oxides in crystal state comprising a predominant proportion of at least one oxide of the formula $XO_2$, where X is one element of tetravalent state, selected from zirconium Zr, hafnium Hf and thorium Th and minor proportion of at least one oxide selected from the group consisting of CaO, MgO, SrO, BaO, $Sc_2O_3$, $Y_2O_3$ and oxides of rare earths.

Preferably, the solid ceramic electrolyte conductive to oxygen ions is made of a material known as "stabilized zirconia", that is to say a solid solution of mineral oxides based in zirconium oxide $ZrO_2$, crystallized in a cubic system, said solid solution comprising in addition to the zirconium oxide, a minor proportion of hafnium oxide $HfO_2$ (which in practice is obtained by its presence in compounds of the latter element in zirconium minerals), and a proportion of at least one oxide selected from the group consisting of CaO, MgO, BaO, SrO, $Sc_2O_3$, $Y_2O_3$ and the oxides of rare earths, sufficient to stabilize the solid solution in the crystallized state in the cubic system.

The form of the body impermeable to the gas, i.e. the solid ceramic electrolyte, can be of any suitable shape adapted to its use in the construction of a combustible battery or an assembly of combustible batteries, for example, that of a cylindrical or conical tube, a disc, etc. The size of this body, in particular its thickness, can be freely selected according to the configuration of the combustible battery, as a function of applicable criteria to the construction of such battery. The body can be disposed in the battery, in a manner to form itself a separation wall between the anode compartment and the cathode compartment of the battery, or even be solid with a suitable mechanical support which can be constituted by one of the electrodes of the battery.

As the ceramic material conductive to oxygen ions and electrons, there is preferably utilized a solid solution of mineral oxides with zirconium oxide as the base, crystallized in cubic system comprising in addition to the zirconium oxide, uranium oxide $UO_2$ and at least one mineral oxide capable of stabilizing the cubic phase of the zirconium oxide. The use of such solid solution is particularly advantageous in the case where the electrolyte is itself constituted by a solid solution of mineral oxide based on zirconium oxide and crystallized according to the cubic system.

Preferably, the mineral oxide capable of stabilizing the cubic phase of the zirconium oxide is selected from the group consisting of, calcium oxide CaO, magnesium oxide MgO, barium oxide BaO, strontium oxide SrO, scandium oxide $Sc_2O_3$, yttrium oxide $Y_2O_3$, ytterbium oxide $Yb_2O_3$ and oxides of rare earths.

In particular, there can be utilized as the ceramic material conductive to oxygen ions and electrons, a ternary solid solution comprising between 78 and 86%, in moles, of zirconium oxide $ZrO_2$, between 4 and 12%, in moles, of uranium oxide $UO_2$, and between 8 and 12%, in moles, of ytterbium oxide. Excellent results have been obtained by utilizing a ternary solid solution having the following molar composition:

zirconium oxide $ZrO_2$:82%
uranium oxide $UO_2$:8% ytterbium oxide $Yb_2O_3$:10%

Preferably, the layer of ceramic material conductive to oxygen ions and electrons is essentially impermeable to gas. That is to say, it substantially prevents the combustible gas or fuel from reaching the electrolyte in molecular form (i.e., non-ionized).

This layer has a continuous structure and its thickness is preferably between 1 and 10 microns.

To manufacture an electrolyte-electrode assembly according to the invention there can be used any appropriate technique. In particular, the layer of ceramic material conductive to oxygen ions and electrodes can be formed on the surface of the solid electrolyte body, which itself can be formed in any known manner, then the electrode can be formed, in a manner also known, on the free surface of this layer.

The electrode can also be formed first, and then the layer of ceramic material conductive to oxygen ions and electrons can be applied on the appropriate surface of this electrode and finally, the body of solid electrolyte can be formed on the free surface of the layer of ceramic material or even further a pre-formed body of solid electrolyte can be secured to this surface.

The known technique applicable to the formation of the layer of ceramic material conductive to oxygen ions and electrodes includes projecting a suspension of powder of this material in a binder liquid followed by evaporation of the liquid and sintering of the powder layer, thus obtained at a temperature and for a time sufficient to confer a suitable cohesion thereto, projecting the dry particles of this material at high temperature onto a substrate, for example, in the flame of a blowtorch or in a plasma torch, depositing by chemical reaction in vapor-phase ("C.V.D."), condensation evaporating in a chamber, under reduced pressure, provided with an apparatus for evaporation by electronic bombardment, etc.

The electrode associated with the solid electrolyte body in the electrolyte-electrode assembly according to the present invention, is adapted to operate as the cathode. It is constituted by a ceramic material having suitable electrical conductivity, capable of being put into the form of a layer permeable to gas, and possessing a coefficient of thermal expansion compatible with that of the solid electrolyte.

The said electrode can notably be an electrically conductive mineral oxide or a mixture or solid solution of conductive oxides; by way of example, there can be noted; indium oxide $In_2O_3$, suitably doped in a manner known of itself, of a type to confer to it a high electrical conductivity; a chromite of at least one element selected from the group of rare earths and yttrium, said chromite being represented by the general formula $T_{1-y}Sr_aCa_bCrO_3$, in which T represents a rare earth or yttrium or a mixture of these elements, $y$, $a$ and $b$ being numbers between 0 or 1, being capable of taking the value of 0 and satisfying the equation: $a+b = y$, in particular chromite of the formula, $LaCrO_3$ and that of the formula $La_{0.84}Sr_{0.16}CrO_3$, in the doped or non-doped state.

According to one very advantageous embodiment of the electrolyte-electrode assembly according to the invention in which te electrode is adapted to operate as a cathode, the electrode comprises a porous layer of doped indium oxide which is composed of dendrites which form trunks having a diameter between 500 and 10,000 A and whose principal axes are perpendicular to the surface of the electrolyte.

According to a variant of this embodiment, the electrode comprises, in addition to the said layer of doped indium oxide, a porous layer formed of granules of at least one chromite of at least one element selected from the group consisting of rare earths and yttrium, said chromite being represented by the general formula:

$$T_{1-y}Sr_aCa_bCrO_3$$

in which T represents a rare earth or yttrium or a mixture of these elements, $y$, $a$ and $b$ being between 0 and 1, being capable of taking the value of 0 and satistying the equation $a + b = y$.

Such electrodes are described in French Pat. No. 2,141,802. The use of these electrodes as the cathode in a combustible battery having a solid electrolyte conductive to oxygen ions has the advantage with respect to the use of a cathode or ordinary type of precious metals such as platinum or silver, of increasing the longevity and the reliability of operation of the battery while lowering the cost of its manufacture.

This same advantage is found, in combination with an improvement of the electrochemical properties, in this embodiment of the assembly of electrolyte-electrode according to the invention which comprises a body impermeable to gas, a solid electrolyte conductive to oxygen ions, a cathode according to the description given in French Pat. No. 2,141,802, noted hereinabove, and a layer of ceramic material conductive to oxygen ions and electrons interposed between the electrolyte and the cathode and solid therewith. In the case where the cathode comprises a layer of chromite of the type mentioned hereinabove, the contact between the layer of ceramic material conductive to oxygen ions and electrons and the cathode is assured through the intermediary of this chromite layer.

Preferably, according to this embodiment of the electrolyte-electrode assembly according to the present invention, the solid electrolyte is a solid solution of mineral oxides having zirconium oxide as its base and crystallized according to the cubic system. The ceramic material conductive to oxygen ions and electrons is constituted by a solid ternary solution comprising between 78and 86%, in moles, of uranium oxide $UO_2$ and between 8and 12%, in moles, of ytterbium oxide $Yb_2O_3$.

In the case of the particular embodiment of the electrolyte-electrode assembly which has just been described, it is particularly advantageous to form the layer of ceramic material conductive to oxygen ions and electrons, by the technique of evaporation-condensation technique under reduced pressure mentioned hereinabove.

In effect, in this case, the layer of ceramic material conductive to oxygen ions and electrons as well as the different layers of material which compose the associated electrode can be formed successively by utilizing the same apparatus with a very precise adjustment of the characteristics of these layers.

DESCRIPTION OF PREFERRED EMBODIMENTS

The invention will be described further with reference to the following examples.

EXAMPLE 1

An electrolyte-electrode assembly according to the invention comprises a layer of solid electrolyte constituted by mixed oxides (solid solution) of $ZrO_2$—$Yb_2O_3$ of respective molar composition 90-10 (in percent in moles of each of the two oxides constituting this solid solution), crystallized in cubic system. This layer is perfectly gas-tight and its thickness is 100 microns.

The assembly additionally comprises an electrode constituted by a layer of indium oxide doped with tin (approximate composition: 96 moles % of $In_2O_3$ and 4 moles % of $SnO_2$), having a total thickness of 100 microns, and having a dendritic structure as described in French Pat. No. 2,141,802.

A layer of solid solution crystallized in cubic phase and having the following molar composition:

$ZrO$:82 moles %,
$Yb_2O_3$:10 moles %,
$UO_2$:8 moles %, in the form of microcrystalline layer composed of grains having a size in the region of 1 micron, substantially gas-tight and, having a thickness of 2 microns, was interposed between the electrolyte and the cathode and adhered thereto.

To prepare this assembly, there is first deposited the layer of solid solution $ZrO_2$—$Yb_2O_3$—$UO_2$ on one of the faces of a solid electrolyte dischaving the composition and the thickness indicated hereinabove and a diameter of 2 cm.

The deposit of the layer of solid solution $ZrO_2$—$Yb_2O_3$—$UO_2$ is effected by condensation vaporization under vacuum in a suitable chamber provided with vaporization apparatus by bombardment by a beam of electrons.

After having deposited the layer of solid solution $ZrO_2$—$Yb_2O_3$—$UO_2$ on the solid electrolyte, there is formed on the free surface of this layer a dendritic layer of indium oxide doped with tin, having a thickness of 100 microns, by proceeding in the manner described in Example 1 of French Pat. No. 2,141,802. The method as disclosed in the French patent comprises mixing the indium and tin oxides in fine powder state and grinding them together to reduce their granulometry still further to a mean size of 20 to 50 microns. Then by isostatic pressure there is formed a body to the final size which is sintered at 1000° C in air for hours.

To this effect, there is utilized the same chamber as that for the deposit of the layer of solid solution $ZrO_2$—$Yb_2O_3$—$UO_2$. There is associated with the electrolyte-electrode assembly, thus constituted, a porous layer of cobalt having a thickness of 10 microns and a porosity of 40% by volume, deposited on the face of the electrolyte opposite to that which is covered by the layer of solid solution $ZrO_2$—$Yb_2O_3$—$UO_2$ and the electrode of indium oxide.

There is thus obtained one element of a combustible battery which can operate by utilizing as the fuel hydrogen preliminarily saturated at 20° C in water vapor (which corresponds to about 3% by volume of water) and as the oxygen containing element, air, these two gases being maintained under atmospheric pressure at the time of the operation of the battery.

The dentritic layer of doped indium oxide being utilized as the cathode and the cobalt layer being utilized as the anode, there is obtained current densities and power densities as indicated in the table hereinafter, under a voltage of 0.5 volts.

| Temperature of Operation (° C) | Density of Current (A/cm²) | Power Density (W/cm²) |
|---|---|---|
| 900 | 1.100 | 0.550 |

EXAMPLE 2

There is prepared, proceeding in analogous manner to that described in Example 1, an electrolyte-electrode assembly according to the invention comprising:

a solid layer of electrolyte identical to that described in Example 1, an electrode constituted by a dendritic layer of indium oxide doped with tin, identical to that described in Example 1, a counter-electrode constituted by a porous layer of cobalt identical to the element of the combustible battery as described in Example 1, and two layers of solid solution $ZrO_2$—$Yb_2O_3$—$UO_2$, identical to that of the assembly described in Example 1, interposed respectively between the electrolyte and the layer of doped indium oxide and between the electrolyte and the layer of cobalt, while strongly adhering with them.

When this assembly is operated (which constitutes an element of the battery) under the same conditions as those specified in Example 1, while utilizing the indium oxide layer as the cathode and the cobalt layer as the anode, there is obtained, for a voltage of 0.5 volts and for the respective operating temperatures of 800°, 850° and 900° C, the following current and power densities:

| Temperature of Operation (° C) | Density of Current (A/cm²) | Power Density (W/cm²) |
|---|---|---|
| 800 | 0.720 | 0.360 |
| 850 | 0.950 | 0.475 |
| 900 | 1.380 | 0.690 |

The two preceding examples demonstrate the result obtained, thanks to the present invention, as regards the improvement of the performance of the combustible battery with solid electrolyte as compared to a battery element of the same type but not including the layer of ceramic material conductive to oxygen ions and electrons interposed between the electrolyte and at least the cathode.

In fact, one such element of the known type, which comprises:

a layer of solid electrolyte identical to that of the assembly described in Example 1, an electrode, constituted by a dendritic layerof indium oxide doped with tin, identical to that of the assembly described in Example 1, and a counter-electrode constituted by a porous layer of cobalt, identical to that in Example 1, obtains, when operation is conducted under the conditions indicated in Example 1 utilizing the indium oxide layer as the cathode and the cobalt layer as the anode, the following current and power densities under a voltage of 0.5 volts and for operation temperatures respectively of 800°, 900° and 1000° C

| Temperature of Operation (° C) | Density of Current (A/cm²) | Power Density (W/cm²) |
|---|---|---|
| 800 | 0.190 | 0.095 |
| 850 | 0.440 | 0.220 |
| 1000 | 0.790 | 0.395 |

EXAMPLE 3

An electrolyte-electrode assembly according to the invention comprising:
- a layer of solid electrolyte identical to that of the assembly described in Example 1,
- an electrode adapted to operate as the cathode, constituted by a dendritic layer of indium oxide, doped with tin, identical to that of the assembly described in Example 1,
- a counter-electrode adapted to function as an anode, constituted by a first porous layer formed of granules of lanthanum chromite, doped with strontium, corresponding to the formula $La_{0.84}Sr_{0.16}CrO_3$, these granules having a granulometry of 0.3 microns, and the thickness of its layer being 2 microns, and by a second porous layer of nickel having a thickness of 10 microns and a porosity of 40% by volume (one such anode is similar to that described in Swiss Pat. No. 512,825),
- two layers of solid solution $ZrO_2$—$Yb_2O_3$—$UO_2$ identical to that of the assembly described in Example 1, interposed respectively between the electrolyte and the cathode and between the electrolyte and the anode, while adhering strongly therewith (with regard to the anode, the contact with the corresponding layer of solid solution $ZrO_2$—$Yb_2O_3$—$UO_2$ is made through the intermediary of the layer of lanthanum chromite dloped with strontium).

In order to prepare this electrolyte-electrode assembly, one proceeds in a manner analogous to that which is described in Example 1, the formation of the layer of granules of lanthanum chromite being obtained in the manner described in Example 2 of French Pat. No. 2,141,802. Therein, sintered granules of lanthanum chromite in powder form of mean diameter of 0.5 microns are deposited by vacuum condensation on the base and then the composite is heated for 2 hours at 950° C.

This electrolyte-electrode assembly constitutes, of itself, a complete element of the combustible battery which permits obtaining when it is operated under the conditions specified in Example 1, a current density of 1.100 amperes/cm² and a power density of 0.550 Watt/cm² under a voltage of 0.5 volts, for a temperature of operation of 900° C.

By way of comparison, an element of an identical combustible battery but not comprising the two layers of solid solution $ZrO_2$—$Yb_2O_3$—$UO_2$ only permits obtaining under the same operational conditions, a current density of 0.370 Amperes/cm² and a power density of 0.185 Watts/cm², at a voltage of 0.5 volt and at a temperature of operation of 900° C.

An electrode for a combustible battery having a solid electrolyte conductive to oxygen ions comprising a porous layer formed of granules of a ceramic material conductive to oxygen ions and electrons has been described in French Pat. No. 1,572,073.

One such granular and porous layer is radially distinguished by its structured from the continuous layer of ceramic material conductive to oxygen ions and electrons which is interposed between the electrolyte and the electrode in the electrolyte-electrode assembly according to the present invention.

In surprising manner, the continuous layer of ceramic material conductive to oxygen ions and electrons according to the present invention, permits obtaining electrochemical results at least equal to those of said granular and porous layer, while permitting a substantial simplification of the manufacture of the electrolyte-electrode assembly.

What is claimed is:

1. In an electrolyte-electrode assembly for a combustible battery comprising a ceramic solid electrolyte conductive to oxygen ions and impermeable to gas, an electrode comprising a porous layer of indium oxide doped with tin, said layer being composed of dendrites which form trunks having a diameter between 500 and 10,000 A and whose principal axes are perpendicular to the surface of the electrolyte, an improvement comprising a continuous layer of ceramic material, conductive to oxygen ions and electrons, interposed between the electrolyte and the electrode and united therewith to form a composite layered assembly, said ceramic material being a solid solution of mineral oxides comprising zirconium oxide, uranium oxide and at least one oxide selected from the group consisting of calcium oxide, magnesium oxide, barium oxide, strontium oxide, scandium oxide, yttrium oxide, ytterbium oxide and oxides of rare earths.

2. An electrolyte-electrode assembly as claimed in claim 1 wherein the said solid electrolyte is a solid solution of mineral oxides in crystal state containing a predominant proportion of at least one oxide of the formula $XO_2$, where X is one element of tetravalent state, selected from the group consisting of zirconium Zr, hafnium Hf and thorium Th and a minor proportion of at least one oxide selected from the group consiting of CaO, MgO, SrO, BaO, $Sc_2O_3$, $Y_2O_3$ and oxides of rare earths, said ceramic material conductive to oxygen ions and electrons being constituted by a solid ternary solution comprising between 78 and 86%, in moles, of zirconium oxide $ZrO_2$, between 4 and 12%, in moles of uranium oxide $UO_2$ and between 8 and 12%, in moles, of ytterbium oxide $Yb_2O_3$.

3. In an electrolyte-electrode assembly for a combustible battery comprising a solid ceramic electrolyte conductive to oxygen ions and impermeable to gas, an electrode comprising a first porous layer of indium oxide doped with tin, said layer being composed of dendrites which form trunks having a diameter between 500 and 10,000 A and whose principal axes are perpendicular to the surface of the electrolyte, and a second porous layer formed of granules of at least one chromite having the formula:

$$T_{1-y}Sr_aCa_bCrO_3$$

in which T is a rare earth or ytrium or a mixture of these elements, $y$, $a$ and $b$ are numbers between 0 and 1, being able to take the value $o$ and satisfying the equation $a + b = y$, an improvement wherein said electrode-electrolyte assembly further comprises a continuous layer of ceramic material, conductive to oxygen ions and electrons, interposed between the electrolyte and the electrode and being united with the electrolyte and with the said porous layer of the electrode to form a composite layered assembly therewith, said ceramic material being a solid solution of mineral oxides comprising zirconium oxide, uranium oxide and at least one oxide selected from the group consisting of calcium oxide, magnesium oxide, barium oxide, strontium oxide, scandium oxide, yttrium oxide, ytterbium oxide and oxides of rare earths.

4. An electrolyte-electrode assembly as claimed in claim 3 wherein said solid electrolyte is a solid solution of mineral oxides in crystal state containing a predominant proportion of at least one oxide of the formula $XO_2$, where X is one element of tetravalent state, selected from the group consisting of zirconium Zr, hafnium Hf and thorium Th and a minor proportion of at least one oxide selected from the group consisting of CaO, MgO, SrO, BaO, $Sc_2O_3$, $Y_2O_3$ and oxides of rare earths, said ceramic material conductive to oxygen ions and electrons being constituted by a solid ternary solution comprising between 78 and 86%, in moles, in zirconium oxide $ZrO_2$, between 4 and 12%, in moles, of uranium oxide $UO_2$ and between 8 and 12%, in moles, of ytterbium oxide $Yb_2O_3$.

* * * * *